US012656882B1

(12) United States Patent
Wang et al.

(10) Patent No.: US 12,656,882 B1
(45) Date of Patent: Jun. 16, 2026

(54) MULTI-MODAL USER INPUTS FOR PHRASE BUILDING

(71) Applicant: Amazon Technologies, Inc., Seattle, WA (US)

(72) Inventors: Bofei Wang, San Jose, CA (US); David Mahmarian, Seattle, WA (US); Diamond Elizabeth Welsh, Langley (CA); Michael Khachatrian, Glendale, CA (US); Robert Norman Neville, Ashburn, VA (US); Juliana Veronica Tarpey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 18/242,431

(22) Filed: Sep. 5, 2023

(51) Int. Cl.
| | |
|---|---|
| *G06F 3/023* | (2006.01) |
| *G06F 3/01* | (2006.01) |
| *G06F 3/0482* | (2013.01) |
| *G06F 3/16* | (2006.01) |
| *G06F 40/274* | (2020.01) |

(52) U.S. Cl.
CPC ............ *G06F 3/0237* (2013.01); *G06F 3/013* (2013.01); *G06F 3/0482* (2013.01); *G06F 3/167* (2013.01); *G06F 40/274* (2020.01)

(58) Field of Classification Search
CPC ...... G06F 3/0237; G06F 3/013; G06F 3/0482; G06F 3/167; G06F 40/274
See application file for complete search history.

(56) References Cited

U.S. PATENT DOCUMENTS

| | | | |
|---|---|---|---|
| 8,126,715 B2 * | 2/2012 | Paek ...................... | G10L 15/19 |
| | | | 704/257 |
| 10,551,915 B2 * | 2/2020 | Kristensson ........ | G06F 3/04842 |
| 2007/0106492 A1 * | 5/2007 | Kim ...................... | G06F 3/0237 |
| | | | 704/9 |
| 2012/0117101 A1 * | 5/2012 | Unruh ................... | G06F 40/274 |
| | | | 707/765 |
| 2014/0253458 A1 * | 9/2014 | Patel .................... | G02B 27/017 |
| | | | 345/173 |

(Continued)

FOREIGN PATENT DOCUMENTS

| | | | | |
|---|---|---|---|---|
| CA | 2809769 A1 * | 9/2014 | .......... | G06F 3/0481 |
| WO | WO-2023224644 A1 * | 11/2023 | ............. | G06F 3/041 |

OTHER PUBLICATIONS

Li, Jiayao, et al. "Evaluating the performance of machine learning algorithms in gaze gesture recognition systems." IEEE access 10(2021): 1020-1035. (Year: 2021).*

(Continued)

*Primary Examiner* — Brian L Albertalli
(74) *Attorney, Agent, or Firm* — Nicholson De Vos Webster & Elliott LLP

(57) ABSTRACT
Techniques for generating and providing phrases built using multi-modal inputs are described herein. These techniques may include generating one or more phrase trees for use in parsing options for user selections through multi-modal inputs to iteratively build an input phrase such as an open-ended phrase. The multi-modal inputs may include gaze inputs, touch inputs, and other inputs to select terms for building a phrase. The selected terms may be used to build a phrase using trees of terms arranged in sequential nodes based on frequently used input phrases to a model.

20 Claims, 8 Drawing Sheets

(56)                    References Cited

U.S. PATENT DOCUMENTS

| | | | | |
|---|---|---|---|---|
| 2018/0018144 A1* | 1/2018 | Morris | .................... | G10L 13/00 |
| 2019/0171348 A1* | 6/2019 | Vishwakarma | ........ | H04N 7/185 |
| 2019/0371002 A1* | 12/2019 | Hwang | ................ | G05B 13/027 |
| 2022/0115010 A1* | 4/2022 | Marti | .................... | G06F 40/205 |
| 2022/0188361 A1* | 6/2022 | Botros | ................... | G02B 27/01 |
| 2024/0096236 A1* | 3/2024 | Moss | ...................... | G10L 15/18 |
| 2024/0184986 A1* | 6/2024 | Fu | ......................... | G06F 40/274 |
| 2025/0013316 A1* | 1/2025 | Badman | ............... | G06F 3/0482 |

OTHER PUBLICATIONS

Majaranta, Päivi, and Kari-Jouko Räihä. "Twenty years of eye typing: systems and design issues." Proceedings of the 2002 symposium on Eye tracking research & applications. 2002. (Year: 2002).*

Friedman, Mark B. "Eyetracker communication system." The Seventh Annual Symposium on Computer Applications in Medical Care, 1983. Proceedings.. IEEE, 1983. (Year: 1983).*

\* cited by examiner

600

GENERATE A FIRST USER INTERFACE
602

DETERMINE A USER SELECTION WITH A MULTI-MODAL INPUT
604

DETERMINE A FIRST SET OF PHRASE TREES
606

DETERMINE A FIRST SET OF TERMS TO DISPLAY
608

DETERMINE A TERM OF THE FIRST SET OF TERMS
610

DETERMINE ONE OR MORE SUBSEQUENT TERMS TO DISPLAY
612

DETERMINE A SUBSEQUENT TERM
614

DETERMINE A PHRASE
616

MULTI-MODAL USER INPUTS FOR PHRASE BUILDING

BACKGROUND

Interacting with computing systems via natural interactions, such as one or more of voice recognition, text, gesture recognition, motion detection, gaze detection, etc., enables natural user interface experiences. As the volume of digital information and the numbers of computing devices increase, managing such natural user interaction interfaces to provide positive user experiences can prove challenging.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
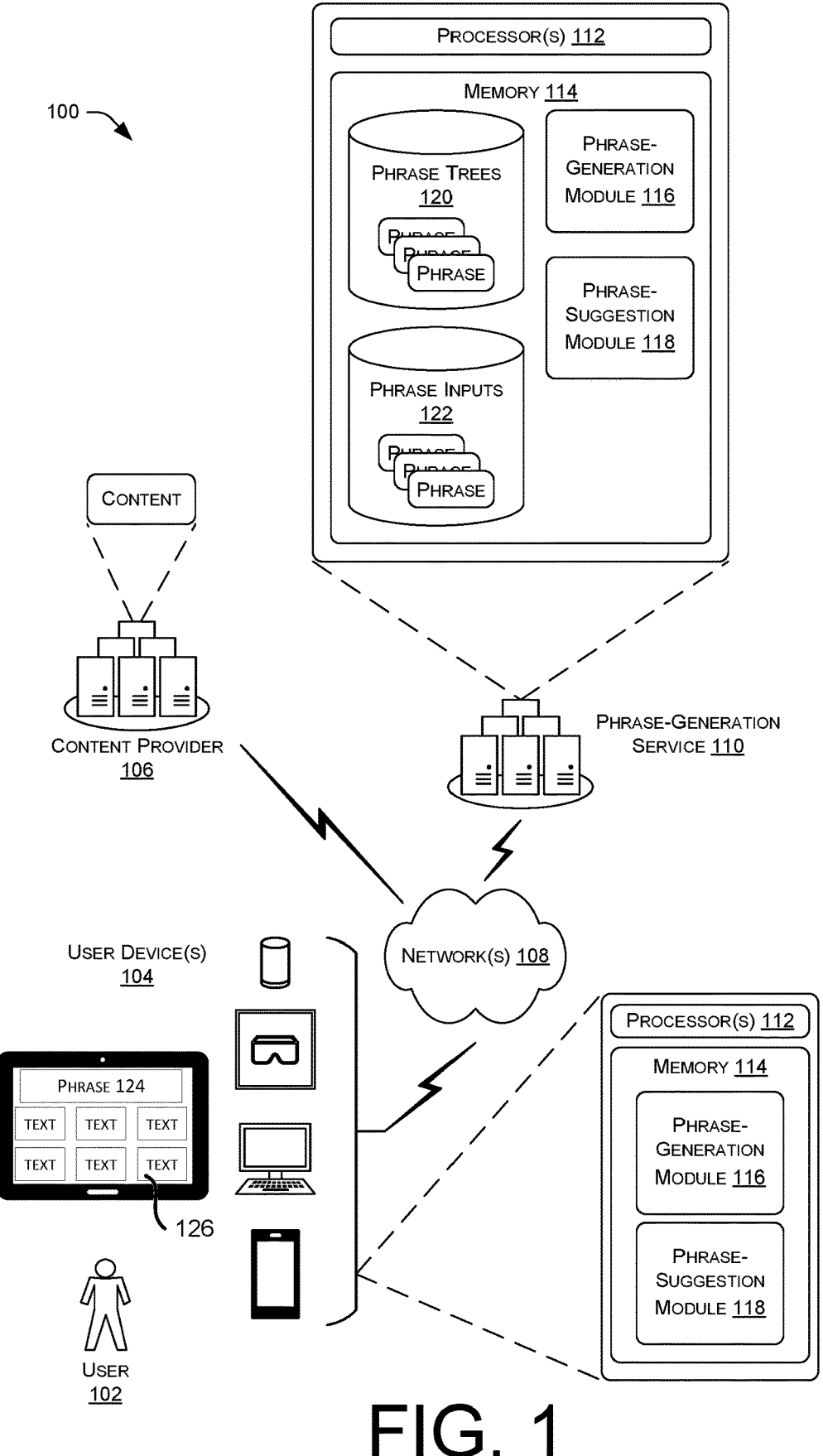
FIG. 1 illustrates an example architecture that includes a phrase-generation service for generating phrases. Once the phrases are generated, some of the phrases may be suggested to one or more users.

This disclosure is directed, in part, to generating phrases and using various user inputs on display devices to build phrases. The goal of phrase builder is to create a guided utterance builder as an alternative to keyboard typing. Users may generate phrases or utterances by gazing, tapping, or otherwise providing inputs to a user device. In some examples, customers with cerebral palsy, multiple sclerosis, muscular dystrophy and ALS will be able to use a voice assistant through the system described herein. This system and technique may also create a new discovery channel for users to find things to try.

In particular, the systems and techniques described herein provide for a method to build phrases on tablet computers, augmented reality devices, virtual reality devices, and other display devices using various types of inputs including eye gaze, tap, touch, gestures, switch access, joystick inputs, sip-and-puff inputs, head mouse, mouth stick, brain-computer interfaces, or other such inputs that may be use to interact with voice-activated systems. The various inputs, as well as other inputs other than speech input may be referred to herein as the multi-modal inputs and may include one or more of the different input types. The systems and techniques described herein enable a guided utterance builder as an alternative to keyboard typing. The system and techniques also provide a mechanism to source relevant data and create to support the phrase builder, which includes frequently-used utterances stored in a database associated with one or more users and including common utterance data across one or more users.

In an example, eye gaze technology may include technology that uses eye tracking to enable user to interact with and control devices using their eyes. Gaze interaction may only require the movement of the eye itself. Other movements or inputs are not required. In some examples, the gaze interactions may be used for selecting items or interacting with a computing device, augmented reality (AR) device, virtual reality (VR) device, tablet, phone, display system, or other such system. The use of gaze inputs and interactions may, through the techniques described herein, provide for open-ended text input to construct phrases and logic to determine options for building the phrase. Such a system provides for a phrase builder that uses multi-modal inputs such as gaze technology, touchscreens, or other such inputs as an alternative to keyboard typing. In such examples, a user may generate a phrase to input into the user device by using gaze direction and/or other multi-modal inputs on a screen of the user device.

The systems and techniques described herein enable improved functioning of computing technology and resources by enabling a user device that has limited computational power and storage to provide gaze tracking and predictive phrase building using multi-modal inputs by leveraging cloud-based storage of manually or automatically generated nested tree structures referred to herein as phrase trees. The phrase trees provide nodes with information connecting to previously selected terms or phrase building blocks and present one or more subsequent potential nodes for the user to select from to continue building the phrase. The phrase trees may be large data structures that are continuously updated and are therefore stored in a cloud-based system and are downloaded to the user device in limited portions (e.g., 5 layers of nodes or other numbers of layers of nodes at a time) such that the user device is not overwhelmed by the amount of data in the phrase tree and unable to process the phrase builder inputs from the user. To support this, the system may split the phrase tree into smaller chunks, and load different groups of files in memory on the user device as needed. Each file may contain two to five levels of children/grandchildren nodes and corresponding information.

In some examples, a phrase tree, which may include a language tree data structure, is used to store element data such as terms and subsequent potential terms in trees such that collective terms already selected may be used to predict a potential next term for selection by a user, and thereby build a phrase using one or more multi-modal inputs. The multi-modal inputs may include a gaze interaction, a touch input, a gesture, or other such input that may be used to interact with one or more computing systems.

In some examples, the phrase trees used to generate and build phrases based on common utterance structures and frequently provided inputs to the system, may be stored in a cloud-based storage system with an application used to dynamically fetch phrase tree data based on the position or current status of the phrase. In some examples, the phrase trees used to generate and build phrases are derived based on potential inputs and/or previously received inputs to a voice-activated system to interact with one or more components of the voice-activated system.

The phrase generator described herein may string together different types of inputs to form phrases. A first type may include a basic request that may be determined based on frequent requests, such as a request that requires no additional input from the user or customer's profile (e.g., "what time is it" or "resume music"). A second type of phrase may take a user selection of limited options and/or may draw information from a user profile (.g., "what is the weather in <user's location>", "call <contact name>", or "turn on the light in <room>"). Such phrases may be built in a top-down way, starting with high level categories or domains (such as "Do Something", "Communicate", "Music", etc.) that may be selected by a first use of a multi-modal input and subsequently building in additional details through additional inputs. A third type of input may include a dynamically built phrase that is built using frequently used phrases or terms. A fourth type of input may include a sentence of phrase that is build using natural language sources to generate phrases that may not have been encountered by the system previously and therefore are entirely open-ended. While some phrases may correspond to requests for a voice assistant or other computer-enabled technology to take a particular action as instructed in the phrase, the technology described herein also enables generation of phrases in a n open-ended manner that may also implement predictive algorithms to assist in generation of open-ended phrases.

The data sources that may be used by the phrase generation described herein may include a set of phrases (including static fully-assembled phrases and phrases with slots for customized inputs such as names or locations) that may be included for specific intents. The data sources may also include a set of frequently asked questions or frequently input phrases from a single particular user (e.g., a user history) or across a set of users. Additional sources of data for use by the system may include natural language processing algorithms and techniques for predicting and assembling phrases in an open-ended manner.

The data sources for phrase generation using the multi-modal inputs may be stored on-board a user device and/or in a cloud-based storage system communicably coupled with the user device. For example, the phrase trees described herein may include a nested tree structure, where each node represents an option to be selected. For the phrase builder, the data is stored as phrase builder element data. In the data store, each word or sub-phrase is stored as a node, which will include the node name, node ID (the hash code of the utterance from parent node until this node), parent node id, children nodes id, etc.). This type of structure may be manually curated or automatically generated based on user phrase inputs into the system. Within the phrase tree, the nodes may each include a label string, and identifier, an array of child nodes indicative of potential subsequent terms or phrase segments, a hash value associated with the previously selected terms used to build the phrase up to a present node, and other such data, including a final phrase option that includes the particular node. The phrase trees, stored as such nested data structures may be stored in cloud-based storage and be accessible through an API (application programming interface). The phrase trees may be dynamically sourced from a dataset of frequent phrase inputs that are processed into the nested tree structure with nodes as described herein. In this manner, the phrase trees may be constantly updated and improved based on user inputs and use cases. The phrase trees may be used to provide a user with options or selections for terms or building blocks of phrases that the user may then select from using one or more different input methods. In some examples, the phrases and phrase trees may be structured and sourced from inputs into a voice assistant and used to generate multi-modal inputs that may be consumed by a voice assistant (for example through text to speech or direct input to a computer aided system).

The generated phrases may be used for providing an input to a voice or computer assistant (e.g., an intelligent assistant) and/or for any interaction with a user device and/or entity.

A user may utilize the intelligent assistant system for myriad functions. For example, the user may provide natural language input to ask the intelligent assistant system to perform a variety of tasks, such as transferring an instance of a computer game from one device to another or to pause or resume music playing through a voice assistant-controlled speaker. The user may ask the system for information about a wide range of topics, such as the weather, personal calendar events, movie show times, etc. In some examples, the intelligent assistant system also may be configured to control elements in an environment, such as a television, speakers of a music system, a gas fireplace, motorized curtains, or other such systems.

The intelligent assistant system also may be utilized to receive and store messages and/or reminders to be delivered at an appropriate future time. Using data received from sensors, the intelligent assistant system may track and/or communicate with one or more users or other entities.

In some examples, the computing device may be operatively connected with one or more other computing devices using a wired connection, or may employ a wireless connection via Wi-Fi, Bluetooth®, or any other suitable wireless communication protocol. For example, the computing device may be communicatively coupled to one or more other computing devices via a network. The network may take the form of a local area network (LAN), wide area network (WAN), wired network, wireless network, personal area network, or a combination thereof, and may include the Internet.

As described in various examples herein, users may interact with an intelligent assistant system using a variety of forms of user input. In some examples, such user input may take the form of gaze inputs, touch inputs, gesture inputs, and/or other input/output devices to build phrases to provide to the intelligent assistant system. spoken utterances. In some examples, context information such as location, environment, conditions, and information on other processes or systems operating concurrently also may be gathered and utilized to process user inputs and determine underlying user intents.

In some instances, the techniques to suggest terms for the phrase builder are personalized to a user. For instance, the techniques may be based on a history of user inputs to the systems described herein. The techniques may suggest one or more of the terms for building phrases based on the individual user history.

A system including a display, a camera directed towards a user space configured to capture image data of a user interacting with the display, and one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The actions include generating, for presentation on the display, a first user interface and then determining a user selection of a graphical display element of the first user interface associated with providing a text input to the system. The system may then determine, based on user data associated with the user, a first set of phrase trees to download from a cloud-based storage system, the first set of phrase trees may include terms and sets of possible subsequent terms for building one or more phrases. The actions may then include determining, based on the user data, a first set of terms to display on a second user interface, the first set of terms may include initial terms of one or more phrase trees of the first set of phrase trees. The actions may further include receiving, from the camera, first image data and determining, based on the first image data, a first gaze location on the second user interface. The actions also include determining, based on the gaze location, a term of the first set of terms and determining, based on the term of the first set of terms and the first set of phrase trees, one or more subsequent terms to display on a third user interface. The actions next include receiving, from the camera, second image data and determining, based on the second image data, a second gaze location on the third user interface. The actions include determining, based on the second gaze location and the third user interface, a second term and determining a phrase for input into the system based on the first term and the second term. Other embodiments of this aspect include corresponding computer systems, apparatus, and computer programs recorded on one or more computer storage devices, each configured to perform the actions of the methods.

The actions further may include determining, based on the user data and the phrase including the first term and the second term, a second set of phrase trees to download from the cloud-based storage system and determining, based on the first term and the second term, one or more subsequent terms to display on a fourth user interface and then receiving, from the camera, third image data and determining, based on the third image data, a third gaze location on the fourth user interface before determining, based on the third gaze location and the fourth user interface, a third term, where determining the phrase is further based on the third term. The phrase may include a phrase for interacting with a digital voice assistant. The display may include at least one of a display of a tablet device, a display of an augmented reality device, a display of a virtual reality device, or a display of a computing device.

The techniques described herein may include generating, for presentation on a display, a first user interface. The method also includes determining a user selection of a display element of the first user interface. The method also includes determining a first set of phrase trees to download from a cloud-based storage system, the first set of phrase trees may include initial terms and sets of possible subsequent terms for building one or more phrases. The method also includes determining, based on the display element, a first set of terms to display on a second user interface, the first set of terms may include initial terms of one or more phrase trees of the first set of phrase trees. The method also includes determining, based on a first user input, a term of the first set of terms. The method also includes determining, based on the term of the first set of terms and the first set of phrase trees, one or more subsequent terms to display on a third user interface. The method also includes determining, based on a second user input and the third user interface, a second term. The method also includes determining a phrase based on the first term and the second term.

The method may include determining, based on the first term and the second term, a second set of phrase trees to download from the cloud-based storage system, the second set of phrase trees may include second terms and second sets of possible subsequent terms and determining, based on the second set of phrase trees, the first term, and the second term, a second set of terms to display on a third user interface and determining, based on a third user input, a third term of the third set of terms, where determining the phrase is further based on the third term. The first set of phrase trees may include phase trees including up to five levels of subsequent terms. The first set of phrase trees are based at least in part on a database of frequent user input phrases. The database of frequent user input phrases may include user input phrases across a plurality of users. The database of frequent user input phrases may include user input phrases based on previous inputs of the user. The first user input may include a first gaze input and the second user input may include a second gaze input. The first user input and the second user input may include selection of a graphical element on a display of a user device. Determining the first set of terms to display and the one or more subsequent terms may include providing receiving an output of a predictive text model.

FIG. 1 illustrates an example architecture 100 in which phrases may be generated and terms for building the phrases may be suggested to one or more users who are then able to build a phrase using a multi-modal input method.

In the illustrated embodiment, the techniques are described in the context of a user 102 operating one or more user devices 104 to access a content provider 106 over a network 108. For instance, user 102 may use the user device 104 to access provider 106 for purposes of consuming content offered by the content provider or engaging in a transaction with the content provider.

The user device 104 may include, for example, a smartphone, tablet, computer, voice input device, mobile computer, laptop, tablet, desktop, virtual reality device, augmented reality device, or other such user device equipped with a display and associated with a camera or other input device for receiving one or more modes of inputs from the user 102. The user device 104 may be used for processing requests from the user 102, performing various tasks or operations, hosting applications or web browsers, or other such operations. The user device 104 may access content from a content provider 106 based on a request from the user 102. The user device 104 may also be used to communicate with one or more additional devices, systems, networks, components, individuals, or other such items through the network 108, which may include the internet, a cell network, local network, or other such wired and/or wireless communication channels.

In architecture 100, content provider 106 may comprise any sort of provider that supports user interaction, supports or hosts content, or otherwise provides data or information that may be consumed through the user device. Here, user 102 may access the content provider 106 via network 108. Network 108 may include any one or combination of multiple different types of networks, such as cable networks, the Internet, and wireless networks. User devices 104, meanwhile, may be implemented as any number of computing devices, including as a personal computer, a laptop computer, a portable digital assistant (PDA), a mobile phone, a set-top box, a game console, a personal media player (PMP), and so forth. User device 104 is equipped with one or more processors and memory to store applications and data. An application, such as a browser or other client application, running on user device 104 may facilitate access to content provider 106 or other systems over network 108.

As illustrated, content provider 106 may be hosted on one or more servers having processing and storage capabilities. In one implementation, the servers might be arranged in a cluster or as a server farm, although other server architectures may also be used. The content provider is capable of handling requests from many users and serving, in response, various content that can be rendered at user devices 104 for consumption by the user.

Architecture 100 also includes a phrase-generation service 110 configured to generate and provide phrases and portions of phrases and/or terms for selection by the user 102. These phrases may be accessed at the user device 104 and used to generate phrases that the user 102 may provide as inputs to the user device 104 to cause the user device 104, or some component connected to the user device 104, to perform an action. The phrase generation service 110 may include storage and processing of a set of phrase trees 120 that provide nested architecture of nodes for predictive suggestion and generation of phrases by the user based on multi-modal inputs.

The phrase trees 122 provide nodes with information connecting to previously selected terms or phrase building blocks and present one or more subsequent potential nodes for the user to select from to continue building the phrase. The phrase trees 120 may be large data structures that are continuously updated and are therefore stored in a cloud-based system and are downloaded to the user device in limited portions (e.g., 5 layers of nodes or other numbers of layers of nodes at a time) such that the user device is not overwhelmed by the amount of data in the phrase tree 120 and unable to process the phrase builder inputs from the user. To support this, the system may split the phrase tree into smaller chunks, and load different groups of files in memory on the user device as needed. Each file may contain two to five levels of children/grandchildren nodes (e.g., two to five layers or more) and corresponding information.

In some examples, a phrase tree 120, which may include a language tree data structure, is used to store element data such as terms and subsequent potential terms in trees such that collective terms already selected may be used to predict a potential next term for selection by a user, and thereby build a phrase using one or more multi-modal inputs. The multi-modal inputs may include a gaze interaction, a touch input, a gesture, or other such input that may be used to interact with one or more computing systems.

In some examples, the phrase trees 120 used to generate and build phrases based on common utterance structures and frequently provided inputs to the system, may be stored in a cloud-based storage system with an application used to dynamically fetch phrase tree layers and data based on the position or current status of the phrase. For example, based on currently existing terms entered and/or selected at the user device 104, the user device 104 may access and download layers of the phrase trees 120 of the subsequent layers of the phrase tree 120. The number of layers may be based on a set number of layers or may be dynamically adjusted based on a predicted phrase and/or subsequent set of terms.

As illustrated, phrase-generation service 110 includes one or more processors 112 as well memory 114. Memory 114 includes a phrase-generation module 116 and a phrase-suggestion module 118. Phrase-generation module 116 functions to analyze phrase inputs 122 to determine phrases and/or to determine words for creation into phrases. Phrase inputs 122 may include commonly used or frequently used input phrases based on a personal user history and/or a collective history for a set of user. Once the phrase-generation module 116 has created and/or mined a corpus of phrases, these phrases may be stored in a database for suggestion and/or for generation of the phrase trees 120.

Phrase-suggestion module 118 takes phrases from the phrase inputs 122 and the phrase trees 120 and suggests one or more phrases to one or more users. In some but not all instances, phrase-suggestion module 118 suggests phrases that are personalized to the user to whom the phrases are suggested. In some but not all instances, phrase-suggestion module 118 suggests phrases that are personalized based on a user history of requests and/or a history or database of phrase inputs 122 from a collection of users.

In an illustrative example, the user device 104 may include a tablet computing device equipped with a camera and a display. The user 102 may select, using a touchscreen of the tablet or other input device, an option to provide a user-generated input into the tablet, for example to provide an input or command to a computer assistant, such as an artificial intelligence assistant or digital assistant that may carry out one or more acts in response to the input from the user 102.

In FIG. 1, user device 104 is shown with an example of a tablet computing device having a phrase 124 build using user selections of text or image inputs 126 as building blocks to assemble the phrase 124. For example, the user 102 may select, using a touchscreen of the user device 104 and/or using gaze inputs on the user device 104, the inputs 126 in sequential order to build the phrase 124 that may then be used to interact with or cause another system to perform an action responding to the content of the phrase 124.

After the user 102 selects the option, the user device 104 may present a user interface with a set of terms for initializing the open-ended user input. The set of terms initially selected for display on the user interface may be based on a set of phrase trees 120 stored locally on the user device 104 and/or predefined initial options for the user input. The user 102 may then select an option among the set of terms to begin the user input using a gaze direction input, as detected by the camera of the tablet and processes using a machine learning algorithm such as a convolutional neural network trained to determine a gaze direction and gaze location on the display of the user device 104 based on images of the face and/or eyes of the user 102 received from the camera of the tablet.

The user 102 may select the option by maintaining their gaze on the selected option for a predetermined residence time. After the term is selected, the phrase-generation module 116 may begin building a phrase with the selected term. The phrase-suggestion module 118 may then select a new set of terms to display on a second user interface. The phrase-suggestion module 118 may select the new set of terms based on the phrase trees 120 and/or the phrase inputs 122. In an example, a first phrase tree stored on the user device may be used to select the new set of terms. The new set of terms may be selected based on being associated with a subsequent node of the phrase tree 120 from the node of the previously selected term. The process may continue, with the user selecting terms from the user interfaces and the phrase-generation module 116 and the phrase-suggestion module 118 being used to select new terms and to iteratively build the phrase one term or set of terms at a time.

In some examples, the phrase tree 120 may be stored on the user device, but only a limited portion of the phrase tree 120 may be downloaded from the phrase-generation service 110 at a particular time. Over time, as the phrase is built by the phrase-generation module 116, the phrase tree 120 may be updated with additional layers and nodes downloaded to the user device 104 from the phrase-generation service 110. The phrase trees 120 may be large data structures that are continuously updated and are therefore stored in a cloud-based system and are downloaded to the user device in limited portions (e.g., 5 layers of nodes or other numbers of layers of nodes at a time) such that the user device 104 is not overwhelmed by the amount of data in the phrase tree and unable to process the phrase builder inputs from the user. To support this, the system may split the phrase tree into smaller chunks, and load different groups of files in memory on the user device as needed. Each file may contain two to five levels of children/grandchildren nodes and corresponding information.

After the phrase-generation module 116 is used to build a phrase, the finished phrase may be passed to the digital assistant for processing based on the request or information contained within the phrase. In this manner, an open-ended request may be built by the user 102 through multi-modal inputs, to build a phrase, for instance when a voice input may not be available for any reason, to communicate with the digital assistant and cause one or more actions to take place.

Though this example has been described with respect to an eye gaze input, additional modalities of user input may be used in place of the gaze input such as touch inputs, gesture inputs, sign language inputs, inputs through other input devices, and other such multi-modal inputs.

Figure 2:
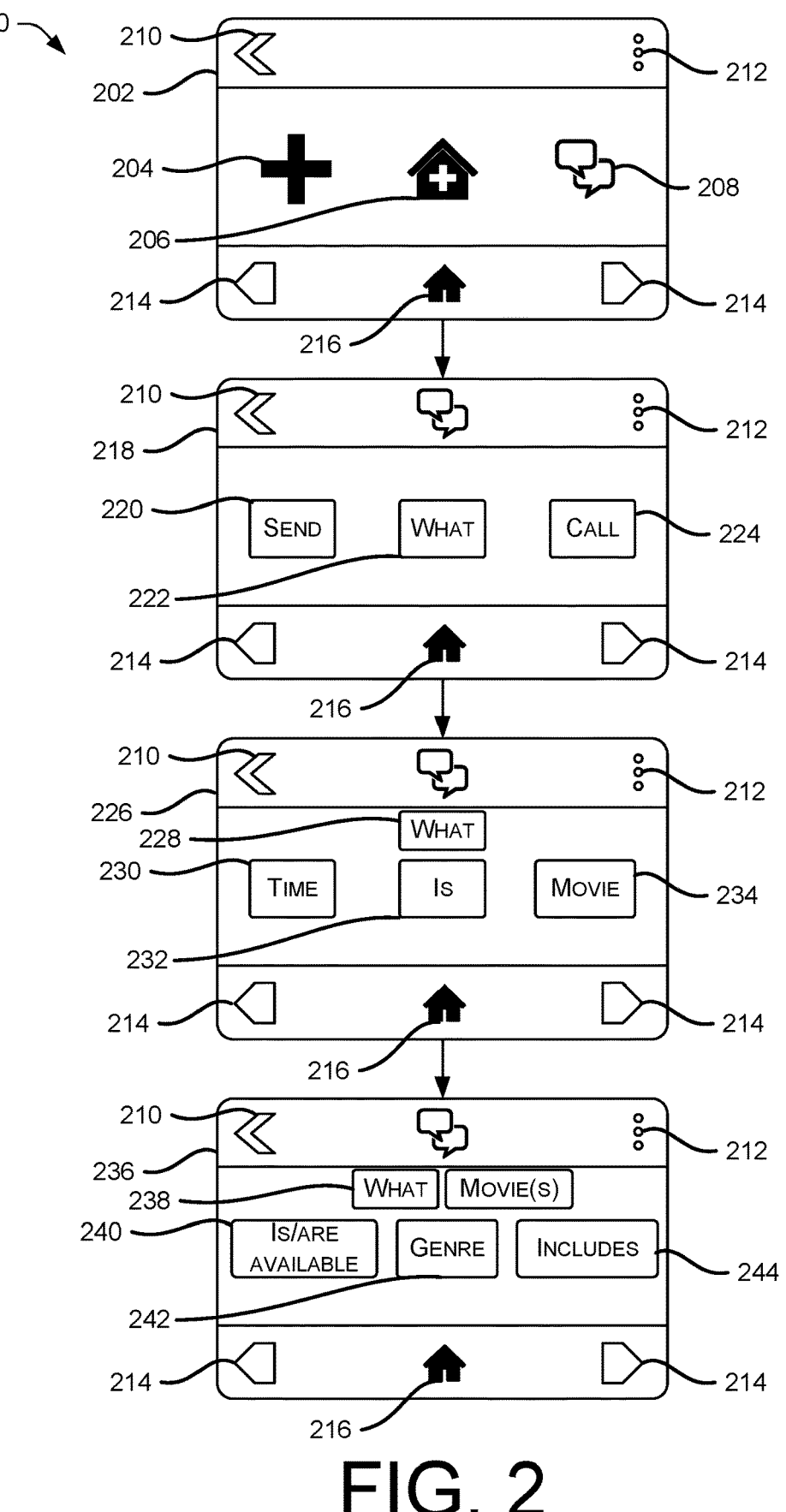
FIG. 2 illustrates an example process for phrase generation on a display based on user inputs.

FIG. 2 illustrates an example process 200 for phrase generation on a display based on user inputs. The process 200 is illustrated through a series of user interfaces that may be displayed on a user device 104 as described with respect to FIG. 1. The process 200 may, for example, be performed on a user device 104 that includes a display and a camera equipped for gaze tracking such as a tablet, virtual reality device, augmented reality device, or other such device. The user interfaces and particular appearance of the interfaces are illustrative only and not intended to limit the possible different appearances of interfaces for receiving multi-modal inputs to build one or more phrases.

At a first time, the user device 104 displays the first interface 202. The first interface 202 includes options for selecting particular types of actions to request. For example, a first icon 204, second icon 206, and a third icon 208 may present different options for adding a new device, interacting with a device, inputting a text request, interacting with a digital assistant, or other such requests. The first interface 202 also includes interface icons 210, 212, 214 and 216 for navigating through different interfaces on the user device 104. In an example, the user may interact with the user device through a gaze input to select one or more of the icons of the interface. As illustrated in FIG. 2, the process 200 may include selection of icon 208 which may be used for interacting with a digital assistant.

At a second time, following selection of the icon 208, the second user interface 218 is displayed to provide a start for generating a phrase to input into the digital assistant. The phrase-generation service 110 and/or the phrase-generation module 116 may be used to build a phrase to input into the digital assistant. In some examples, the phrase-suggestion module 118 may select one or more terms 220, 222, and 224 from a phrase tree 120 for display on the second user interface 218. The terms 220, 222, and 224 may be selected based on a user history and/or collective history of frequent user inputs and may reflect predicted likely initial terms for a phrase input. Though illustrated with three terms 220, 222, and 224, in some examples additional terms and/or options for selecting a term not initially displayed may be present within the second user interface 218. Similar to the selection of the icon 208, the user 102 may select one of the terms 222 using a multi-modal input such as a gaze selection, touch input, input device, or other multi-modal input. The terms 220, 222, and 224 may be selected and displayed on the second user interface 218 from a first phrase tree or first set of phrase trees that may be downloaded to the user device 104 and/or accessed through a cloud-based server that stores one or more sets of phrase trees.

At a third time, following selection of the first term 222, the third user interface 226 is presented with a second set of terms 230, 232, and 234. The initial term 228 is also displayed to provide a reminder of the previously selected terms by the user. In this manner, the user may continue to build the phrase. The second set of terms 230, 232, and 234 may be selected from the phrase tree based on the initial term 228 selected by the user. In some examples, after selection of the initial term (or a term after the initial term), the user device may access the phrase tree 120 from the cloud-based server to download additional layers and/or nodes of the phrase tree 120. In this manner, the phrase tree 120, which may be quite large and expansive, may be limited as stored on-device to only a small portion of the tree, thereby conserving space and computing resources. This conservation of space and resources may enable the use of the techniques described herein on devices having limited storage space and/or processing capacity. The user may select a term from the second set of terms 230, 232, and 234 in a similar manner to the selection of the initial term 228.

At a fourth time, following selection of the second term at the third time, the fourth user interface 236 is presented with a third set of terms 240, 242, and 244. The phrase 238 as-generated is displayed so the user can view the previous terms. The third set of terms 240, 242, and 244 are selected based on a phrase tree 120 and/or predictive text algorithm. In some examples, the third set of terms 240, 242, and 244 may be determined based on each of the terms previously selected, not just a most recent term selected by the user. Additional user interfaces may be presented with additional sets of terms selected based on the previous terms already selected and the process 200 may be iteratively performed until the user has completed generation of their open-ended phrase for use with a digital assistant or other such operation.

In a second illustrative example, the user may select the third icon 208 for interacting with a virtual assistance, such as Amazon Alexa® through the process 200. For instance, the user may select the third icon 208 that may then provide options, through the subsequent user interfaces to build a phrase such as "Alexa, call Emmett." The virtual assistant may then process the request and may initiate a voice and/or audio call with the contact "Emmett."

Figure 3:
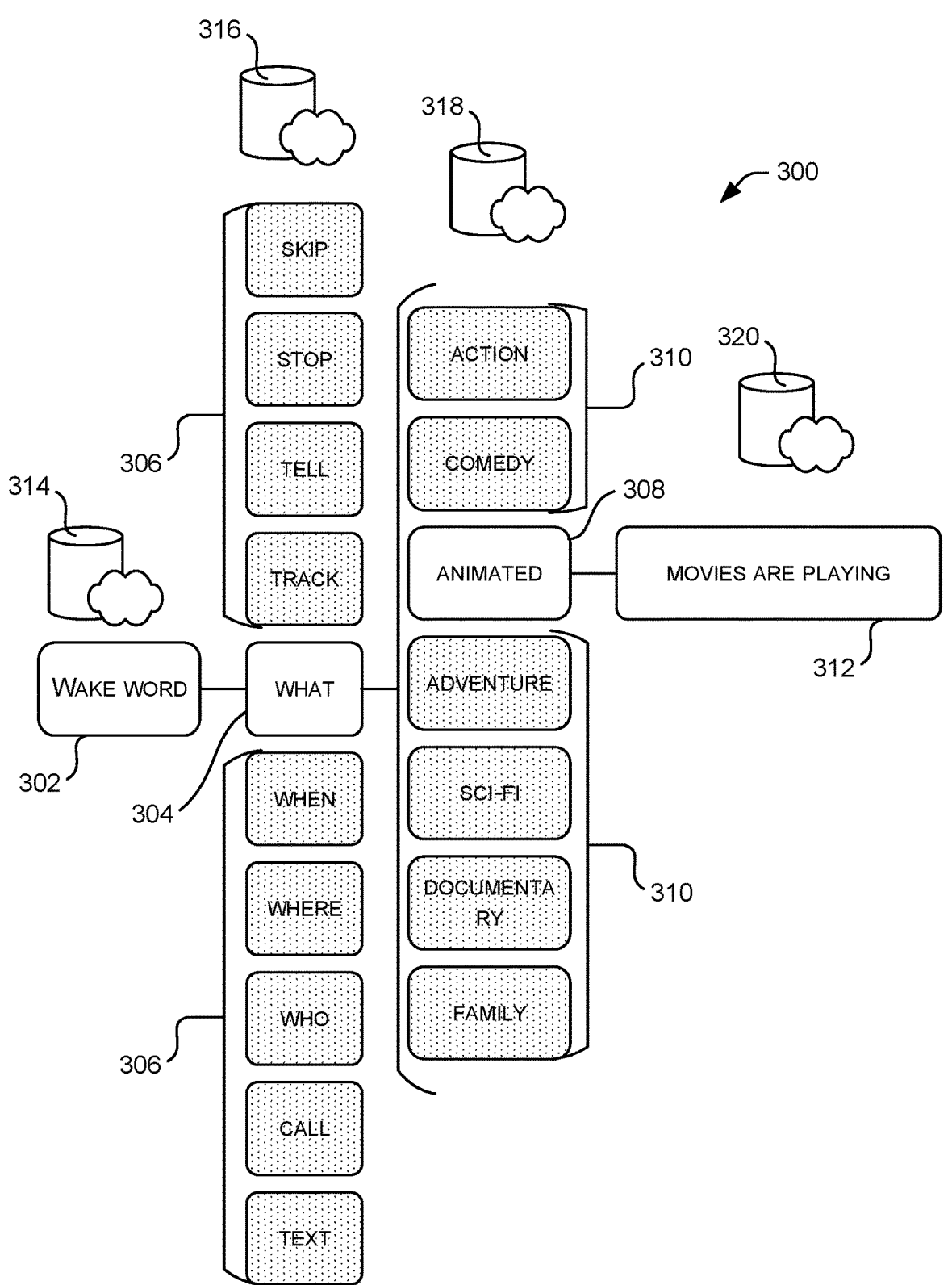
FIG. 3 illustrates an example of a phrase tree used for phrase generation.

FIG. 3 illustrates an example of a phrase tree 300 used for phrase generation using multi-modal inputs. The phrase tree 300 may be an illustrative example of a limited section of a phrase tree having nodes and connected nodes of potential subsequent terms. The phrase tree 300 may be stored on a device in memory and/or a cloud-based database for use in generating phrases and/or open-ended inputs for interacting with a digital assistant or other such system.

The phrase tree 300 provides nodes with information connecting to previously selected terms or phrase building blocks and present one or more subsequent potential nodes for the user to select from to continue building the phrase.

The phrase tree 300 may include a large data structure that is continuously updated and are therefore stored in a cloud-based system and are downloaded to the user device in limited portions (e.g., 5 layers of nodes or other numbers of layers of nodes at a time) such that the user device is not overwhelmed by the amount of data in the phrase tree and unable to process the phrase builder inputs from the user. To support this, the system may split the phrase tree 300 into smaller chunks, and load different groups of files in memory on the user device as needed. Each file may contain two to five levels of children/grandchildren nodes and corresponding information.

In some examples, a phrase tree 300, which may include a language tree data structure, is used to store element data such as terms and subsequent potential terms in phrase trees 300 such that collective terms already selected may be used to predict a potential next term for selection by a user, and thereby build a phrase using one or more multi-modal inputs. The multi-modal inputs may include a gaze interaction, a touch input, a gesture, or other such input that may be used to interact with one or more computing systems.

In some examples, the phrase tree 300 may be used to generate and build phrases based on common utterance structures and frequently provided inputs to the system, may be stored in a cloud-based storage system with an application used to dynamically fetch phrase tree data based on the position or current status of the phrase.

The data sources for phrase generation using the multi-modal inputs may be stored on-board a user device and/or in a cloud-based storage system communicably coupled with the user device. For example, the phrase tree 300 described herein may include a nested tree structure, where each node represents an option to be selected. For the phrase builder, the data is stored as phrase builder element data. In the data store, each word or sub-phrase is stored as a node, which will include the node name, node ID (the hash code of the utterance from parent node until this node), parent node id, children nodes id, etc.). This type of structure may be manually curated or automatically generated based on user phrase inputs into the system. Within the phrase tree, the nodes may each include a label string, and identifier, an array of child nodes indicative of potential subsequent terms or phrase segments, a hash value associated with the previously selected terms used to build the phrase up to a present node, and other such data, including a final phrase option that includes the particular node. The phrase trees, stored as such nested data structures may be stored in cloud-based storage and be accessible through an API (application programming interface). The phrase trees may be dynamically sourced from a dataset of frequent phrase inputs that are processed into the nested tree structure with nodes as described herein. In this manner, the phrase trees may be constantly updated and improved based on user inputs and use cases. The phrase trees may be used to provide a user with options or selections for terms or building blocks of phrases that the user may then select from using one or more different input methods. In some examples, the phrases and phrase trees may be structured and sourced from inputs into a voice assistant and used to generate multi-modal inputs that may be consumed by a voice assistant (for example through text to speech or direct input to a computer aided system).

Initially, a first node 302 may be selected by a user with a multi-modal input. The first node 302 may include a term that may be hard-coded or previously selected to be an initial term for selection by the user. In some examples, the first node 302 may represent a node previously selected and the phrase tree 300 may represent a limited section of a larger tree. The subsequent nodes 304 and 306 represent potential second terms for following the first node 302 based on previous inputs, source data, templates, or other such information.

The subsequent node 304 is selected through a multi-modal input and subsequent terms 308 and 310 are next options presented following the first node 302 and the subsequent node 304. In some examples, the string of nodes may be associated with a hash value representative of all of the nodes and terms used in building the phrase such that the portions of the phrase tree 300 that are available are based on the entire sequence of terms leading up to a current phrase input. Similarly, subsequent node 308 is selected with a following phrase 312 selected to complete the phrase generation process. In some examples, the phrase generation service may be configured to detect and/or determine completion of the phrase based on a template, structure, natural language processing, or other such information.

The phrase tree 300, including the different nodes, are stored at local and/or cloud-based databases. The databases 314, 316, 318, and 320 may store the nodes and possible alternative branches of the phrase tree 300. The databases 314 may also store additional data associated with the nodes. For example, a first database 314 may store metadata associated with the first node 302. The metadata may include a number of times or frequency with which the term is used by a particular user or across a group of users. The metadata may include information related to when the first node 302 was added to the phrase tree. The metadata may also include an indication of the source of the first node 302, such as whether the first node 302 was generated and/or added based on an aggregate usage across a number of users, a user history for an individual user, training, or other sources. The database 316 may likewise include metadata associated with the subsequent nodes 304 and 306, database 318 may include metadata associated with the subsequent nodes 308 and 310, and database 320 may include metadata associated with the subsequent node 312. In some examples, the databases may be a single database with a data structure to store metadata for each node of the phrase tree 300.

In some examples, the metadata stored in the databases 314, 316, 318, and 320 may be used to rank or provide a preference for presentation of terms at the user interface of the user device. For instance, the user interface may be limited for space and only a limited subset of terms may be presented. Based on the metadata stored in association with the phrase tree 300, the user device and/or the phrase generation service 110 may select among the potential terms for most likely terms based on the previous terms selected for the phrase by the user in addition to the metadata.

In some examples, the data stored with the phrase trees 300, and/or accessed by the user device while the user is creating the phrase using the multi-modal input includes contextual information relating to an environment, time period, surrounding area, or other such contextual information. In some examples, the contextual information may relate to an event, weather, or occurrence happening in a geographic region around the user device. For example, a concert or other social event may be taking place nearby and based on the contextual information and/or information related to inputs of other users in the area, as the user begins to assemble a phrase "when is the . . . ," the user device may access the contextual information to identify the local concert as a suggested term to present on the user interface.

In some examples, the contextual data or other such data, including some or all of the metadata, may be stored on-board the user device. In some examples, the data may include information relating to user preferences, for example to indicate how many terms to display on the user interface of the user device. The user may also adjust rankings or ordering of terms to be presented or certain terms to always initially present on the user interface. Such user preferences may also include calibration data for the one or more user input modes (e.g., the multi-modal inputs). The user may calibrate the different multi-modal inputs for increased accuracy of selection of terms for phrase generation.

In some examples, the phrase tree 300 may be based on and/or designed using capabilities or recognized inputs for systems that the user device 104 may communicate with. For example, a virtual assistant system may have a structure of phrase or a repository of received inputs that may be used to build the phrase tree 300. For example, the phrase tree 300 may be built using a repository of inputs into a virtual assistant from a collection of users and/or from a single individual user. The phrase tree 300 may be generated by grouping phrases together that share common portions of a phrase. For example, referring to FIG. 3, from the repository of terms, a first collection of phrases may be selected that include a wake word 302 followed by term 304 ("what"). The subsequent terms following term 304 may include the next terms that appear in the first collection of phrases. In some examples, the most common results may be presented at or near a top and/or center of a screen of the user device 104 while less frequently used terms may appear further from the top or on a subsequent screen. In this manner, the most frequently used terms may be readily accessible to the user 102 while assembling the phrase.

The phrase tree 300 may be stored in tables and referential tables, for example with a first table storing a first collection of terms that may be used to begin a phrase. Each entry in the table may be linked to a secondary table that includes subsequent terms that may be used following the term selected from the first table. In this manner, the referential tables may be used to update the phrase tree 300 as new terms or phrases are added without requiring reconstruction of the phrase tree 300. Additionally, within the tables, the phrase tree 300 may include additional metadata relating to frequency of usage, parts of speech, and other such information that may be used to determine which set of terms to display on the user device 104.

In some examples, the phrase tree 300 may be structured and/or generated based on capabilities or possible operations that a subsequent system may be able to perform. For instance, the phrase tree 300 may be assembled and/or generated based on possible actions that may be performed by a connected device (e.g., phrases instructing to power on, power off, perform certain actions, respond in a particular manner, etc.). In this manner, the phrase tree 300 may be tied to the supported system and different phrase trees may be used for generating phrase inputs based on what system the user wishes to interact with.

Figure 4:
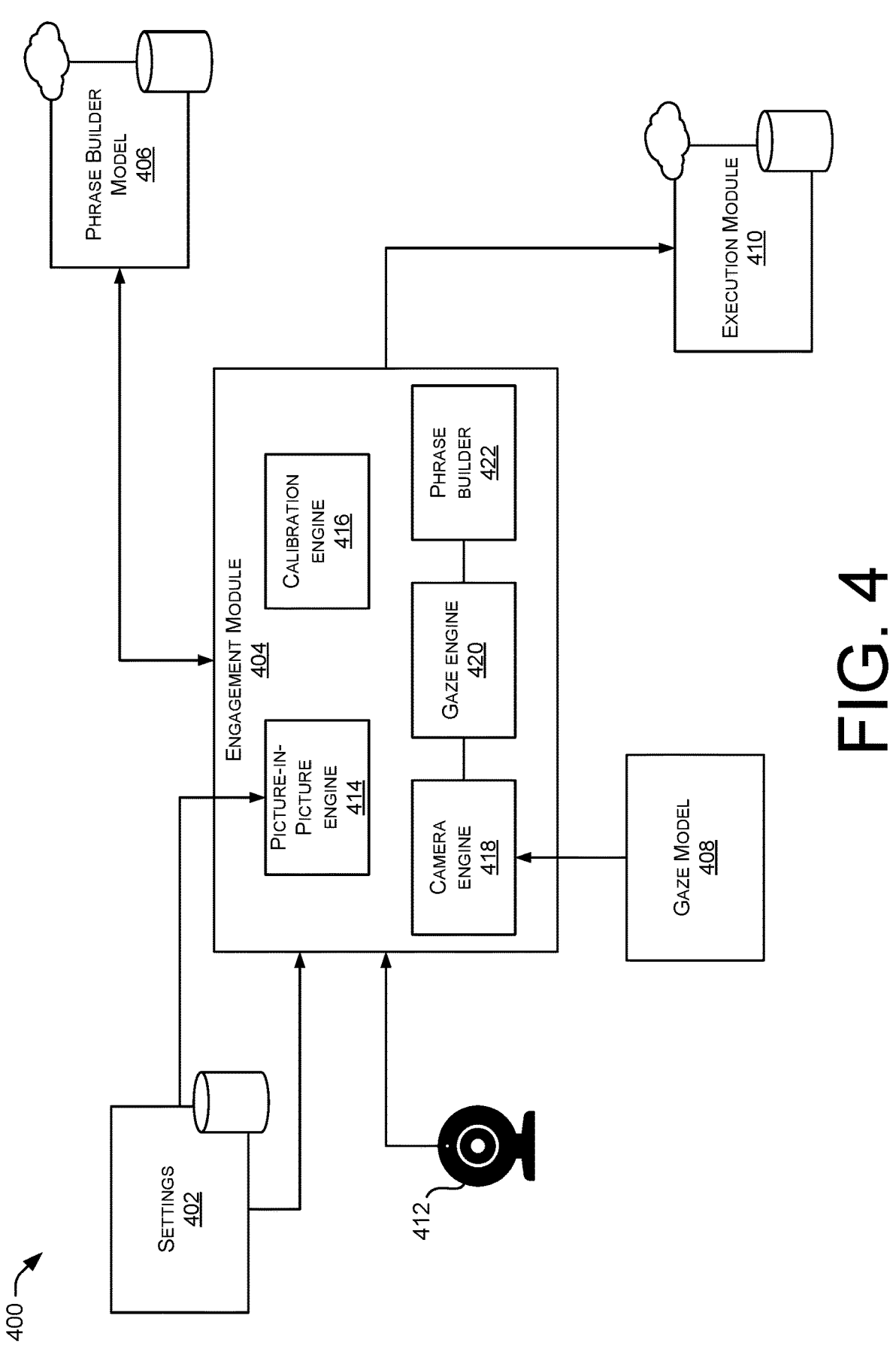
FIG. 4 illustrates an example architecture of a system for phrase generation using gaze inputs.

FIG. 4 illustrates an example architecture of a system 400 for phrase generation using gaze inputs as an example of a multi-modal input. The system 400 may be part of a system including a user device 104 as described herein. Though the particular system 400 of FIG. 4 is described with respect to a gaze input, other components may be substituted or used for receiving or determining the multi-modal user inputs in place of the camera 412 for other systems and types of inputs.

In the system 400, a database of settings 402 may be used to engage the multi-modal input and phrase generation as described herein, as well as to engage or adjust settings for a gaze input including calibrating the gaze detection through a calibration engine 416.

The system 400 includes an engagement module 404 that may be used for presenting information on user interfaces, determining gaze inputs, and building phrases as described herein. The engagement module 404 may include a picture-in-picture engine 414 for determining user inputs with the display of the user device based on gaze information. A camera engine 418 may be used to receive image data from the camera 412 and communicate with the gaze engine 420 and a gaze model 408 to determine a selection of an interface element of the user device. The phrase builder 422 may be used to build phrases, as described with respect to the phrase-generation service 110.

The engagement module 404 may be in communication with a phrase builder model 406, for example to download information related to the phrase trees, user inputs, input history, and other such phrase-building information. The execution module 410 may be used to execute one or more operations using the input generated by the phrase builder 422.

Figure 5:
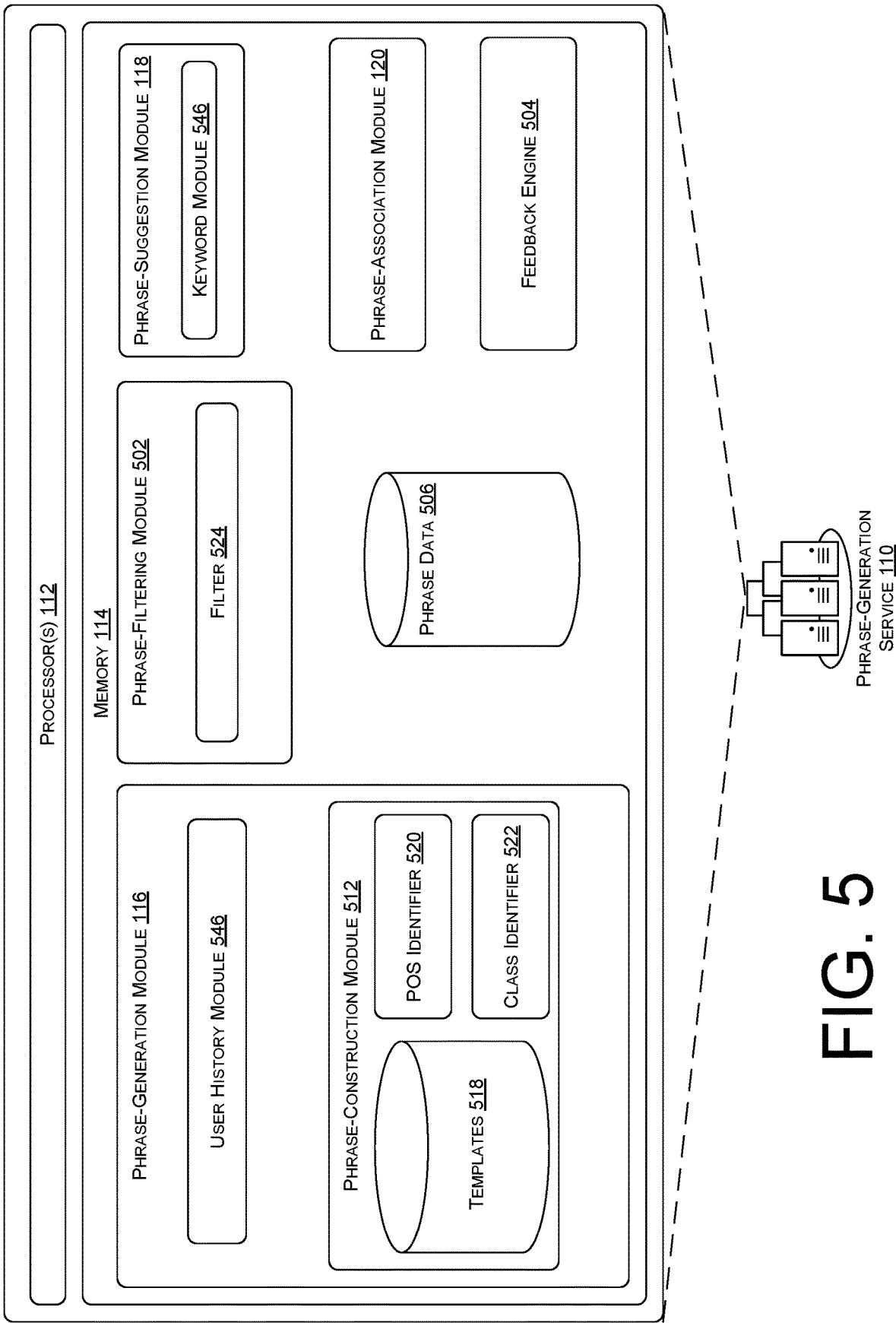
FIG. 5 illustrates example components of the phrase-generation service of FIG. 1.

FIG. 5 illustrates example components of phrase-generation service 110 of FIG. 1. As illustrated and as discussed above, service 110 includes phrase-generation module 116 and phrase-suggestion module 118. The phrase-generation service 110 may also include a phrase-filtering module 502, a phrase-construction module 512, and a feedback engine 504.

Phrase-generation module 116 functions to generate phrases, as discussed above, for use and interaction through a user device 104. Phrase-filtering module 502 functions to filter out one or more phrases from the phrase data 506 including phrase trees 120 and phrase inputs 122. Phrase-suggestion module 118 may then suggest phrases for display at the user device 104 for selection by the user 104. Finally, feedback engine 504 may monitor the characteristics of the phrases actually being selected by user 102 and, in response, cause phrase-suggestion module 118 to suggest phrases that more closely match these characteristics and/or to adjust the phrase trees 120.

Phrase-generation module 116 may generate the phrase as input by the user and may record a user history through a user history module 546. Phrase-construction module 512, meanwhile, uses words found within the phrase trees, input from the user device 104 and may use predictive text inputs to construct phrases for performing one or more actions as described herein.

Phrase-construction module 512, meanwhile, constructs phrases from words and includes a database of templates 518, a part-of-speech (POS) identifier 520 and a class identifier 522. Database 518 may include varying types of templates, such as part-of-speech templates and personalized templates. Each part-of-speech template may comprise one or more placeholders, with each placeholder specifying a part-of-speech. With this template, phrase-construction module 512 may apply words having the associated part(s)-of-speech to the template to create one or more phrases. To do so, module 512 includes a part-of-speech (POS) identifier 520 to identify a part of speech for each word of the phrase tree 120 and/or phrase data 506.

Phrase-construction module 512 may apply words having associated parts of speech to a template to create one or more phrases. For instance, module 512 may create (and store in phrase data 506) phrases as input and received by the user device 104.

Additionally, some or all of the part-of-speech templates within database 518 may include one or more placeholders that specify a describable class either in lieu of in or in addition to a particular part of speech. This describable class may specify any sort of characteristic that, when taken together with a part of speech, specifies a subset of the words associated with that particular part of speech. As such, phrase-construction module 512 may include a class identifier 522 that functions to categorize words within respective classes. Class identifier 522 may categorize these words based on lists that an operator of phrase-generation service 110 has manually entered, by reference to sources such as encyclopedias or dictionaries, or by any other suitable manner.

Once phrases are received from a history of user inputs, the phrase-filtering module 502 may filter out a portion of these phrases to filter out less-desirable phrases from users' standpoints. That is, module 502 attempts to filter out phrases such that the remaining phrases are perceived, on the whole, as more interesting to most users than compared to the filtered-out phrases. It is specifically noted that while the illustrated embodiment of phrase-generation service 110 filters out phrases, in other embodiments service 110 may instead positively identify "good" phrases. Furthermore, in some instances, certain phrases of the input phrase history may or may not be subject to the filtering process.

Finally, phrase-generation service 110 is shown to include feedback engine 504. Feedback engine 504 functions to track user selections of the phrases, determine characteristics of the phrases being selected, modify the criteria that generates suggested terms and/or is used to build phrase trees 120.

Figure 6:
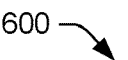
FIG. 6 illustrates an example flow diagram for generating phrases based on user inputs on a display device.

FIG. 6 illustrates a process for generating phrases using multi-modal inputs on a user device. The process described herein is illustrated as a collection of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 6 illustrates an example flow diagram for a process 600 for generating phrases based on user inputs on a display device. The process 600 may be carried out on a user device 104 such as described with respect to FIG. 1 herein. The process 600 may begin at 602, where the user device may generate a first user interface. The first user interface may include a presentation of a display screen offering interactive options for a user to select to have one or more different interactions with the user device 104. The first user interface may provide an option for a user to select an ability to control a device, provide an input, communicate with another person or device, interact with a digital assistant, input text, or other interactions.

At 604, the process 600 includes the user device 104 determining a user selection made using a multi-modal input. The user selection may be made as described herein, for example using a touch input on a touchscreen of the user device 104, a gaze input, a selection using a selection device, or other such input.

At 606, the process 600 includes the user device 104 determining a first set of phrase trees. The first set of phrase trees may be based on initial terms for starting a phrase. The initial terms may be based on a history of user inputs or frequently provided inputs to the system, for example based on most commonly input terms from a particular user or set of users. The first set of phrase trees may be selected based on the initial terms presented on the display. The first set of phrase trees may be selected from a database that may be stored on a user device and/or on a cloud-based storage system in communication with the user device.

At 608, the process 600 includes the user device 104 determining a first set of terms to display. The first set of terms to display may be based on popularity, ranking, or a predictive algorithm determining a most likely set of terms from the first phrase trees to display on the user interface.

At 610, the process 600 includes the user device receiving an input from a user and processing the input to determine a term of the first set of terms based on the user input to the user device 104. The term may be selected using one or more different types of multi-model user inputs to the user device.

At 612, the process 600 includes the user device 104 determining one or more subsequent terms to display on the display of the user device 104. The subsequent terms may be determined based on the nodes of the phrase trees, with a first node associated with a previously selected term and the subsequent terms selected based on subsequent nodes of the phrase tree representing potential terms for following the existing portions of the phrase already generated by the user through the user device.

In some examples, determining the subsequent terms to display at the user device may also include downloading additional phrase trees and/or portions of phrase trees based on the previously input terms. For example, the user device 104 may access one or more additional layers of the phrase tree that are downstream of the node including the term previously selected by the user. In this manner, the phrase tree data stored on the user device 104 may include a subset of the phrase trees rather than an entire phrase tree of all options.

In some examples, the portions of the phrase tree downloaded to the user device 104 may be further based on a system or expected input. For example, the user device 104 may receive an input indicating that they wish to provide a phrase input into a virtual assistant. Accordingly, the user device 104 may download portions of the phrase tree downstream of the selected node associated with the last selected term that correspond to potential inputs, capabilities, or other requirements for input at the virtual assistant. In this manner, the user device 104 may download a subset of the phrase tree based on not only downloading a limited number of layers of the phrase tree at a time, but also based on downloading limited portions of the available layers.

After the phrase tree is downloaded to the user device 104, the user device 104 may determine one or more terms to display on the display of the user device 104 for selection by a user. The terms may be selected and/or determined for display based on frequency of use by the user, frequency of use across a group of users, part of speech, predictive text algorithms, or other such techniques. The terms may be selected from the phrase tree by traversing from a previously selected node from a most recently selected term to a subsequent layer.

At 614, the process 600 includes the user device 104 receiving a user input and determining a subsequent term selected by the user based on a user input. The term may be selected using one or more different types of multi-model user inputs to the user device. For example, the user device 104 may receive a user input such as a gaze input that the user device 104 uses to determine a gaze location of the user on the display and determines a selection of a term associated with the location. The subsequent term may be selected from among the set of terms displayed at 612 on the user device 104. The subsequent terms selected at 614 and the additional subsequent terms to display at 612 may be performed iteratively to continue generating an open-ended phrase through the user device.

At 616, the process 600 includes the user device generating a phrase based on the selected terms from the user inputs. The phrase may be generated through the iterative completion of steps 612 and 614 to select one or more terms at a time to generate a phrase in a step-wise manner. The phrase may be completed as indicated by the user and/or may be identified as completed based on the format and/or template of the phrase indicating an end of the input phrase. In some examples, the user device 104 may generate a phrase by filling in one or more additional parts of a phrase, such as connecting terms between terms selected by the user. The connecting terms may include connective words or phrases may include linking terms, transition words, or other such parts of speech. The connecting terms may be words or terms used to link words, phrases, or sentences that may be determined by the user device 104 based on receiving user inputs at the user device. The input phrase may be used to perform one or more acts through the user device such as providing the phrase to a virtual assistant and/or causing one or more connected systems to act in accordance with the instructions of the phrase.

Figure 7:
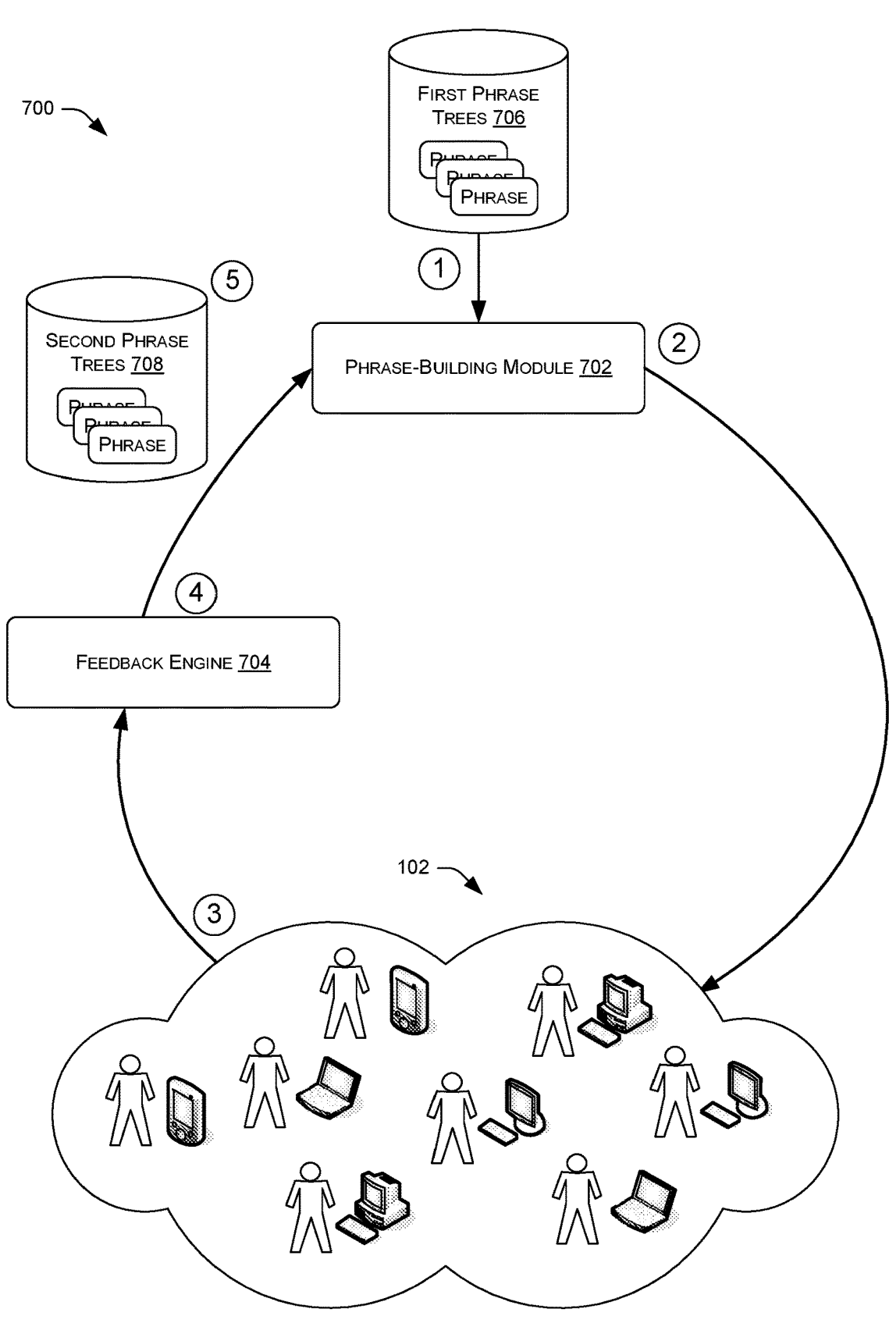
FIG. 7 illustrates an example feedback loop for learning characteristics about the phrases selected by users and, in response to the learning, altering the characteristics of phrase trees and suggested terms.

FIG. 7 illustrates an example feedback loop 700 for learning characteristics about the phrases selected by users and, in response to the learning, altering the characteristics of phrases suggested to users through the phrase trees 120 and phrase-suggestion module. As illustrated, at operation one (1) phrases of a first set of phrase trees 706 are consumed by a phrase building module 702, which may be similar and/or identical to the phrase-generation service 110 of FIG. 1. At operation two (2), the phrases built using multi-modal inputs at the user device 104 by the users 102 are generated and consumed by digital assistants and other such systems.

Operation three (3) then returns input phrases used and consumed by various systems after being built using the multi-modal inputs. At operation three (4) the feedback engine 704 may receive these user selections of phrases. In response to receiving these selections, feedback engine 704 may analyze characteristics associated with the selected phrases. For instance, feedback engine 704 may determine which types of phrases users are selecting as well as the details about these selected phrases. For instance, feedback engine 704 may determine if users are inputting one or more similar phrases with regularity including the structure of the phrases and/or the if one or more phrases fit within a common template or phrase tree structure. Within a set of categories, such as within particular phrase trees 120, feedback engine 704 may determine which subcategories are popular, and which are not. For instance, engine 704 may determine which combinations of terms are used more frequently than others based on user history. With this information, feedback engine 704 may, at operation five (5)

alter the phrase trees 120 to fit the second phrase trees 708 based on the collective user inputs.

Figure 8:
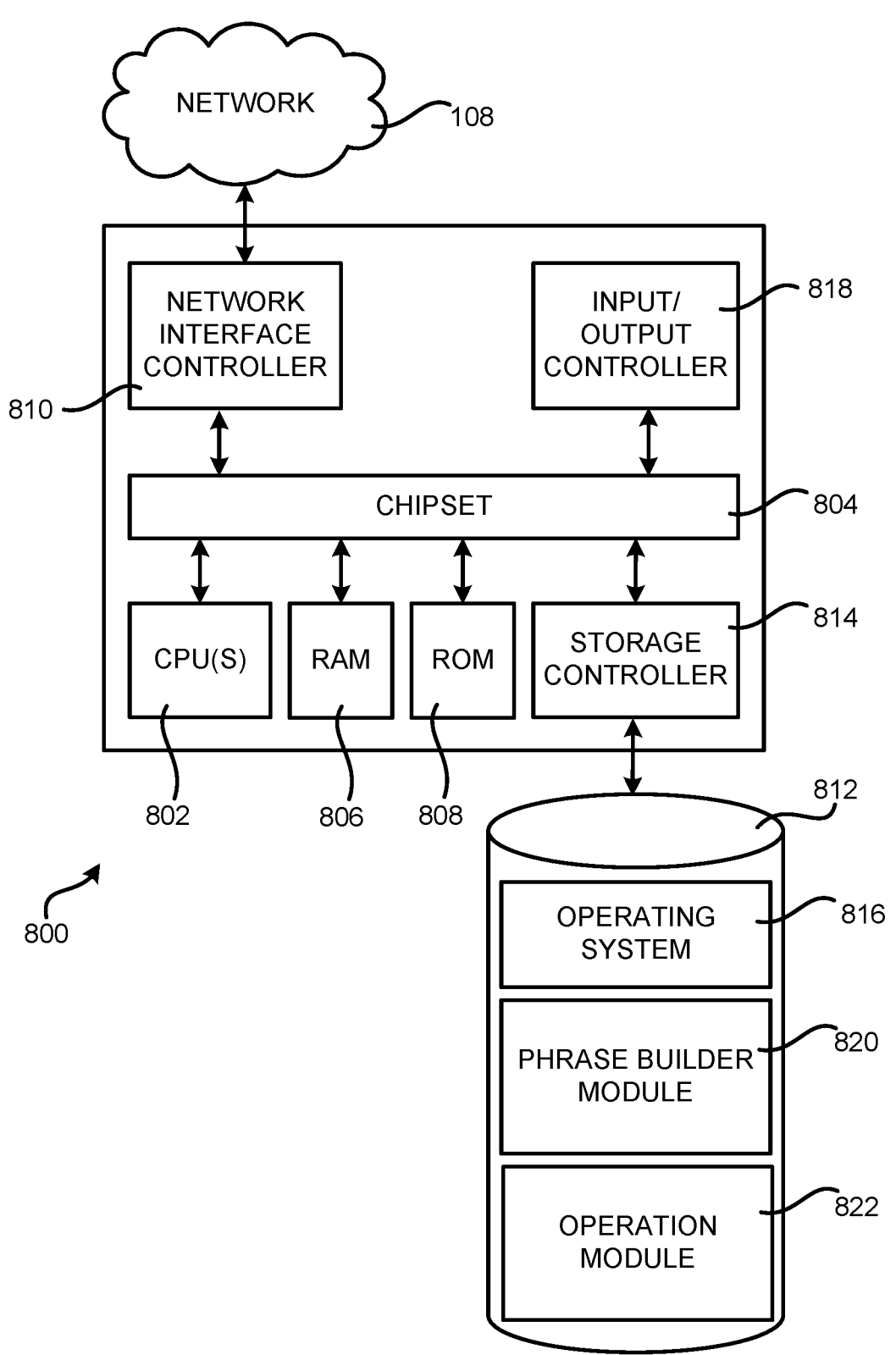
FIG. 8 is a computer architecture diagram showing one illustrative computer hardware architecture for use in computing devices configured to implement the concepts and technologies disclosed herein in one embodiment.

FIG. 8 shows an example computer architecture for a computer 800 capable of executing the software components described herein for predictive fact generation for query optimization. The computer architecture 800 shown in FIG. 8 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the client devices 104, or other computing platform.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 are standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 804 provides an interface between the CPUs 802 and the remainder of the components and devices on the baseboard. The chipset 804 may provide an interface to a random-access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that that help to startup the computer 800 and to transfer information between the various components and devices. The ROM 808 or NVRAM may also store other software components necessary for the operation of the computer 800 in accordance with the embodiments described herein.

According to various embodiments, the computer 800 may operate in a networked environment using logical connections to remote computing devices and computer systems through a network, such as a local-area network ("LAN"), a wide-area network ("WAN"), the Internet, or any other networking topology known in the art that connects the computer 800 to remote computers. The chipset 804 includes functionality for providing network connectivity through a network interface controller ("NIC") 810, such as a gigabit Ethernet adapter.

For example, the NIC 810 may be capable of connecting the computer 800 to other computing devices, such as the application servers 110, the client devices 104, a data storage system in the merchant system 108, and the like, over the network 108 described above in regard to FIG. 1. It should be appreciated that multiple NICs 810 may be present in the computer 800, connecting the computer to other types of networks and remote computer systems.

The computer 800 may be connected to a mass storage device 812 that provides non-volatile storage for the computer. The mass storage device 812 may store system programs, application programs, other program modules, and data, which have been described in greater detail herein. The mass storage device 812 may be connected to the computer 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 800 may store data on the mass storage device 812 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 812 is characterized as primary or secondary storage, or the like.

For example, the computer 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the physical storage units.

In addition to the mass storage device 812 described above, the computer 800 might have access to other computer-readable media to store and retrieve information, such as program modules, data structures, or other data. It should be appreciated by those skilled in the art that computer-readable media can be any available media that may be accessed by the computer 800, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 812 may store an operating system 816 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX or SOLARIS operating systems. It should be appreciated that other operating systems may also be utilized. The mass storage device 812 may also include a phrase builder module 820 such as the phrase-generation service 110 described herein as well as an operation module 822 that performs one or more operations based on phrases built by the phrase builder module 820.

The mass storage device 812 might also store other system or application programs and data utilized by the computer 800. For instance, when utilized to implement one or more of the user devices 104, the mass storage device 812 may store the client application 122. When utilized to implement one or more of the application servers 110, the mass storage device may store the online shopping module 112 and/or the fact generation engine 122. The mass storage device 812 might also store other programs and data for use in implementing the various embodiments disclosed herein.

In one embodiment, the mass storage device 812 or other computer-readable storage media may be encoded with computer-executable instructions that, when loaded into the computer 800, transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 has access to computer-readable storage media storing computer-executable instructions that, when executed by the computer, perform the various routines and operations described herein.

The computer 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display device, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for predictively generating facts for query optimization have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a display;
a camera directed towards a user space configured to capture image data of a user interacting with the display;
one or more processors; and
one or more non-transitory computer-readable media storing computer-executable instructions that, when executed on the one or more processors, cause the one or more processors to perform acts comprising:
generating, for presentation on the display, a first user interface;
determining a user selection of a graphical display element of the first user interface associated with providing a text input to the system;
determining, based on user data, a first set of phrase trees to download from a cloud-based storage system, the first set of phrase trees comprising terms and sets of possible subsequent terms for building one or more phrases, the first set of phrase trees generated based on instructions provided to a virtual assistant;
downloading, to the system, limited portions of phrase trees of the first set of phrase trees, the limited portions of the phrase trees comprising limited layers of nodes of respective ones of the phrase trees;
determining, based on the user data and using the limited portions of the phrase trees downloaded to the system, a first set of terms for presentation within a second user interface on the display, the first set of terms comprising initial terms of one or more of the phrase trees;
receiving, from the camera, first image data;
determining, based on the first image data, a first gaze location within the second user interface;
determining, based on the first gaze location, a first term of the first set of terms;
determining, based on the first term and the limited portions of the phrase trees downloaded to the system, one or more subsequent terms for presentation within a third user interface on the display;
receiving, from the camera, second image data;
determining, based on the second image data, a second gaze location on the third user interface;
determining, based on the second gaze location and the third user interface, a second term; and
determining a phrase for input into the system based on the first term and the second term.

2. The system of claim 1, wherein the acts further comprise:
determining, based on the user data and the phrase including the first term and the second term, a second set of phrase trees to download from the cloud-based storage system;
determining, based on the first term and the second term, one or more subsequent terms to display on a fourth user interface;
receiving, from the camera, third image data;
determining, based on the third image data, a third gaze location on the fourth user interface; and
determining, based on the third gaze location and the fourth user interface, a third term, wherein determining the phrase is further based on the third term.

3. The system of claim 1, wherein the phrase comprises a phrase for interacting with a digital voice assistant.

4. The system of claim 1, wherein the display comprises at least one of:
a display of a tablet device;
a display of an augmented reality device;
a display of a virtual reality device; or
a display of a computing device.

5. A method comprising:
generating, for presentation on a display of a user device, a first set of user interface elements;
determining a user selection of a first element of the first set of user interface elements;
determining, in response to the user selection of the first element, a first set of phrase trees to download from a cloud-based storage system, the first set of phrase trees comprising initial terms and sets of possible subsequent terms for building one or more phrases, and wherein the first set of phrase trees are derived based on a set of potential inputs to a voice-activated system;
downloading, to the user device, limited portions of phrase trees of the first set of phrase trees, the limited portions of the phrase trees comprising limited layers of nodes of respective ones of the phrase trees;
determining, based on the first element and using the limited portions of the phrase trees downloaded to the user device, a first set of terms to display with a second set of user interface elements, the first set of terms comprising initial terms of one or more of the phrase trees;
determining, based on a first user input, a first term of the first set of terms, wherein the first user input comprises a non-speech input;
determining, based on the first term and the limited portions of the phrase trees downloaded to the user device, one or more subsequent terms to display with a third set of user interface elements;
determining, based on a second user input and the third set of user interface elements, a second term of the one or more subsequent terms; and
determining a phrase based on the first term and the second term.

6. The method of claim 5, further comprising:
determining, based on the first term and the second term, a second set of phrase trees to download from the cloud-based storage system, the second set of phrase trees comprising second terms and second sets of possible subsequent terms;
determining, based on the second set of phrase trees, the first term, and the second term, a third set of terms to display with a fourth set of user interface elements; and
determining, based on a third user input, a third term of the third set of terms, wherein determining the phrase is further based on the third term.

7. The method of claim 5, wherein the first set of phrase trees comprise phase trees including up to five levels of subsequent terms.

8. The method of claim 5, wherein the first set of phrase trees are based at least in part on a database of frequent user input phrases to the voice-activated system.

9. The method of claim 8, wherein the database of frequent user input phrases comprises user input phrases across a plurality of users.

10. The method of claim 8, wherein the database of frequent user input phrases comprises user input phrases based on previous inputs of the user.

11. The method of claim 5, wherein the first user input comprises a first gaze input and the second user input comprises a second gaze input.

12. The method of claim 5, wherein the first user input and the second user input comprise selection of a graphical element on a display of a user device.

13. The method of claim 5, wherein determining the first set of terms to display and the one or more subsequent terms comprises providing receiving an output of a predictive text model.

14. One or more non-transitory computer-readable media storing computer-executable instructions that, when executed by one or more processors, cause the one or more processors to perform acts comprising:

generating, for presentation on a display of a user device, a first set of user interface elements;

determining a user selection of a first element of the first set of user interface elements;

determining, in response to the user selection of the first element, a first set of phrase trees to download from a cloud-based storage system, the first set of phrase trees comprising initial terms and sets of possible subsequent terms for building one or more phrases, and wherein the first set of phrase trees are derived based on a set of potential inputs to a voice-activated system;

downloading, to the user device, limited portions of phrase trees of the first set of phrase trees, the limited portions of the phrase trees comprising limited layers of nodes of respective ones of the phrase trees;

determining, based on the first element and using the limited portions of the phrase trees downloaded to the user device, a first set of terms to display with a second set of user interface elements, the first set of terms comprising initial terms of one or more of the phrase trees;

determining, based on a first user input, a first term of the first set of terms, wherein the first user input comprises a non-speech input;

determining, based on the first term and the limited portions of the phrase trees downloaded to the user device, one or more subsequent terms to display with a third set of user interface elements;

determining, based on a second user input and the third set of user interface elements, a second term of the one or more subsequent terms; and determining a phrase based on the first term and the second term.

15. The one or more non-transitory computer-readable media of claim 14, wherein the acts further comprise:

determining, based on the first term and the second term, a second set of phrase trees to download from the cloud-based storage system, the second set of phrase trees comprising second terms and second sets of possible subsequent terms;

determining, based on the second set of phrase trees, the first term, and the second term, a third set of terms to display with a fourth set of user interface elements; and determining, based on a third user input, a third term of the third set of terms, wherein determining the phrase is further based on the third term.

16. The one or more non-transitory computer-readable media of claim 14, wherein determining the one or more subsequent terms to display with the third set of user interface elements comprises providing the first term and the phrase tree to a predictive model.

17. The one or more non-transitory computer-readable media of claim 14, wherein the first set of phrase trees are based at least in part on a database of frequent user input phrases to the voice-activated system.

18. The one or more non-transitory computer-readable media of claim 14, wherein determining the first set of phase trees is further based on an environment surrounding a user device.

19. The one or more non-transitory computer-readable media of claim 14, wherein the acts further comprise processing the phrase to perform one or more acts via a cloud-based computing environment.

20. The one or more non-transitory computer-readable media of claim 14, wherein the first user input comprises a gaze input determined by using a machine learning algorithm trained to determine gaze location on a display based on image data from a camera associated with the display.

\* \* \* \* \*